US012649674B2

(12) United States Patent
Xu et al.

(10) Patent No.: US 12,649,674 B2
(45) Date of Patent: Jun. 9, 2026

(54) METHOD AND DEVICE FOR PREPARING SLIGHTLY ACIDIC ELECTROLYZED WATER WITH CONTROLLABLE AND STABLE CONCENTRATION

(71) Applicant: Yiwu Xu, Zhejiang (CN)

(72) Inventors: Yiwu Xu, Ningbo City (CN); Peifeng Chen, Ningbo City (CN); Zefeng Chen, Ningbo City (CN)

(73) Assignee: NINGBO C.F ELECTRONIC TECH CO., LTD, Ningbo City (CN)

( * ) Notice: Subject to any disclaimer, the term of this patent is extended or adjusted under 35 U.S.C. 154(b) by 54 days.

(21) Appl. No.: 17/441,616

(22) PCT Filed: Jul. 30, 2021

(86) PCT No.: PCT/CN2021/109856
§ 371 (c)(1),
(2) Date: Sep. 21, 2021

(87) PCT Pub. No.: WO2022/262089
PCT Pub. Date: Dec. 22, 2022

(65) Prior Publication Data
US 2024/0101450 A1 Mar. 28, 2024

(30) Foreign Application Priority Data

Jun. 15, 2021 (CN) .......................... 202110660958.3

(51) Int. Cl.
*C02F 1/461* (2023.01)

(52) U.S. Cl.
CPC .. *C02F 1/4618* (2013.01); *C02F 2001/46185* (2013.01); *C02F 2201/4611* (2013.01);
(Continued)

(58) Field of Classification Search
CPC ... C02F 1/4618–2001/4618; C02F 2201/4611; C02F 2201/46135; C25B 15/02–15/033
See application file for complete search history.

(56) References Cited

U.S. PATENT DOCUMENTS

2019/0136394 A1* 5/2019 Edgar ................... C25B 15/031
2020/0361793 A1* 11/2020 You ..................... C02F 1/46109

FOREIGN PATENT DOCUMENTS

CN 209412332 U 9/2019
JP 11271268 A * 10/1999
(Continued)

OTHER PUBLICATIONS

English Translation of JP-11271268-A (Year: 1998).*
(Continued)

*Primary Examiner* — Alexander W Keeling
(74) *Attorney, Agent, or Firm* — Tarolli, Sundheim, Covell & Tummino LLP

(57) ABSTRACT

The disclosure provides a method and device for preparing slightly acidic electrolyzed water with a controllable and stable concentration. According to the method, a solution addition velocity of a first solution addition device is adjusted according to a difference between a detected voltage $U_{detected}$ and a control voltage $U_{control}$ in an electrolytic cell, so that the first solution addition device adds an electrolyte stock solution to the electrolytic cell in real time, thereby preparing the slightly acidic electrolyzed water with a controllable and stable concentration. The device includes an electrolyte stock solution storage, an electrolytic cell and a first mixer connected sequentially. A first solution addition device is connected in series between the electrolyte stock solution storage and the electrolytic cell. The disclosure overcomes the defects of uncontrollable and unstable con-
(Continued)

centration in the preparation of present slightly acidic electrolyzed water.

14 Claims, 6 Drawing Sheets

(52) U.S. Cl.
 CPC .............. *C02F 2201/46135* (2013.01); *C02F 2201/4614* (2013.01)

(56) References Cited

FOREIGN PATENT DOCUMENTS

| JP | H11271268 | A | | 10/1999 | | |
|----|-----------|---|---|---------|---|---|
| JP | 2000042556 | A | * | 2/2000 | .............. | A61L 2/18 |
| JP | 204283662 | A | | 10/2004 | | |
| JP | 2019093327 | A | | 6/2019 | | |
| WO | 2021071026 | A1 | | 4/2021 | | |

OTHER PUBLICATIONS

Applicant: Ningbo C.F Electronic Tech Co., Ltd.; "Method and Device for Preparing Slightly Acidic Electrolyzed Water with Controllable and Stable Concentration"; International Application No. PCT/CN2021/109856; Filed: Jul. 30, 2021; PCT International Search Report and Written Opinion; 9 pgs.
Xie Zonghui, "The working principle of sodium hypochlorite generator" Hainan economic development and environmental protection Oct. 31, 1991 pp. 366-368.

* cited by examiner

METHOD AND DEVICE FOR PREPARING SLIGHTLY ACIDIC ELECTROLYZED WATER WITH CONTROLLABLE AND STABLE CONCENTRATION

CROSS-REFERENCE TO RELATED APPLICATION

This application is a U.S. National Stage Application filed under 35 U.S.C. § 371 of PCT/CN2021/109856, filed Jul. 30, 2021, and entitled METHOD AND DEVICE FOR PREPARING SLIGHTLY ACIDIC ELECTROLYZED WATER WITH CONTROLLABLE AND STABLE CON-CENTRATION, which International Application claims the benefit of priority from Chinese Patent Application No. 202110660958.3, filed on Jun. 15, 2021. The entire contents of each of the above-identified patent applications are incorporated herein by reference.

TECHNICAL FIELD

The disclosure relates to the field of slightly acidic electrolyzed water, in particular to a method and device for preparing slightly acidic electrolyzed water with a controllable and stable concentration.

BACKGROUND

Hypochlorous acid is a strong oxidant that can kill bacteria in water, so chlorine gas is often used to sterilize tap water (0.002 g of chlorine gas is introduced into 1 L of water). Hypochlorous acid can discolor dyes and organic coloring matters, and is generally used as a bleach, an oxidant and a disinfectant. In biology, hypochlorous acid is used by neutrophils to kill bacteria, and is widely used in chlorine-containing disinfectant products. At present, hypochlorous acid is mainly prepared by the following manners: dilute hydrochloric acid is electrolyzed by an electrolyzer to generate chlorine gas and hydrogen gas, and then the chlorine gas is dissolved in water to generate hypochlorous acid.

In order to make the hypochlorous acid for home use, people designed a device for preparing hypochlorous acid water. The manner for preparing the hypochlorous acid water by using the device is as follows: an electrolyte stock solution is pumped into an electrolytic cell by a metering pump, and then electrolyzed by energization, and the generated chlorine gas is introduced into a mixer and mixed with tap water, thereby producing hypochlorous acid water. A constant current is used, and a certain amount of electrolyte stock solution is added into the electrolytic cell by the metering pump at intervals. Therefore, at the beginning of the addition, the concentration of the electrolyte stock solution in the electrolytic cell is high, and a large amount of chlorine gas is produced, so the concentration of the hypochlorous acid water is high. After a period of electrolysis, the concentration of the electrolyte stock solution becomes lower, and the amount of chlorine gas produced is low, so the concentration of the hypochlorous acid water is low. Besides, after the concentration of the electrolyte stock solution becomes lower, heat generation is greatly increased, and the effective power is low. As a result, the concentration of the hypochlorous acid water prepared by the existing device is not stable, and the hypochlorous acid water with a controllable and stable concentration cannot be obtained.

SUMMARY

(I) Technical Problem to be Solved

The problem to be solved by the disclosure is to provide a method and device for preparing slightly acidic electrolyzed water with a controllable and stable concentration to overcome the defects of uncontrollable, unstable concentration and low effective power in the preparation of present slightly acidic electrolyzed water.

(II) Technical Solution

In order to solve the technical problem, the disclosure provides a method for preparing slightly acidic electrolyzed water with a controllable and stable concentration. A solution addition velocity of a first solution addition device is adjusted according to a difference between a detected voltage $U_{detected}$ and a control voltage $U_{control}$ in an electrolytic cell, so that the first solution addition device adds an electrolyte stock solution to the electrolytic cell in real time, thereby preparing the slightly acidic electrolyzed water with a controllable and stable concentration. In the method, after the electrolyte stock solution in the electrolytic cell is electrolyzed, the concentration of the slightly acidic electrolyzed water becomes lower. Then, the solution addition velocity of the first solution addition device is adjusted based on the difference between the detected voltage and the control voltage in the electrolytic cell, so that the first solution addition device adds the electrolyte stock solution to the electrolytic cell in real time. The voltage difference is greater, the rotation speed of the first solution addition device is faster. In one aspect, the decrease of the electrolyte stock solution in the electrolytic cell is compensated, the electrolysis velocity is increased, and a larger amount of chlorine gas is generated. In another aspect, an addition velocity of the chlorine gas discharged from the electrolytic cell is increased. Therefore, the velocity of reaction between chlorine gas and water is increased from two aspects, so the concentration of the slightly acidic electrolyzed water will increase, thereby achieving the purpose of preparing the slightly acidic electrolyzed water with a controllable and stable concentration.

Further, the method specifically includes the following steps:

step S001, setting $C_{effluent}$ and carrying out electrolysis; where a suitable effluent concentration of slightly acidic electrolyzed water $C_{effluent}$ is set according to needs, and after the electrolytic cell is filled up with the electrolyte stock solution, a current $I_{control}$ and a voltage $U_{control}$ are applied to two ends of the electrolytic cell and electrolysis is started;

step S002, calculating $\Delta U$; where the actual voltage $U_{detected}$ in the electrolytic cell is detected, and $\Delta U$ is calculated according to $$\Delta U = U_{detected} - U_{control};$$

step S003, determining whether $\Delta U$ is greater than 0; if so, the first solution addition device works; if not, the first solution addition device stops working; step S004, repeating steps S002-S003.

Further, in step S001, $U_{control}$ is determined according to $U_{control} = f(C_{effluent}, T_{detected})$, where $U_{control}$ is directly proportional to $C_{effluent}$, and $U_{control}$ is inversely proportional to $T_{detected}$. Specifically, $U_{control}$ is calculated according to the following formula:

$$U_{control}=K_1 \cdot (C_{effluent}-K_2) \cdot [1-K_3 \cdot (T_{detected}-T_{calibrated})]+K_4 \qquad 5$$

where $K_1$, $K_2$, $K_3$, $K_4$ and $T_{calibrated}$ are all constants greater than 0.

Further, in step S001, $U_{control}$ is determined according to $U_{control}=f(C_{effluent})$, where $U_{control}$ is directly proportional to $C_{effluent}$. Specifically, $U_{control}$ is calculated according to the following formula:

$$U_{control}=K_1 \cdot (C_{effluent}-K_2)+K_4$$

where $K_1$, $K_2$ and $K_4$ are all constants greater than 0.

Further, $I_{control}$ and the voltage $U_{control}$ are determined by the following steps:

step A1, calculating $I_{calibrated}$; where based on $C_{effluent}$, $I_{calibrated}$ is calculated according to $$I_{calibrated} = \frac{(C_{effluent} - K_2)}{K_5},$$

where $K_5$ is a constant greater than 0;

step A2, calculating $\Delta T$; where an actual temperature $T_{detected}$ of the electrolyte solution in the electrolytic cell is detected, preset $T_{calibrated}$ in the system is acquired, and $\Delta T$ is calculated according to $\Delta T=T_{detected}-T_{calibrated}$;

step A3, calculating $I_{control}$ and $U_{control}$; where based on $\Delta T$, $I_{control}$ is calculated according to $I_{control}=I_{calibrated}(1-K_3 \cdot \Delta T)$; and then, $U_{control}$ is calculated according to $U_{control}=K_6 \cdot I_{control}+K_4$, where $K_6$ is a constant greater than 0.

Further, $I_{control}$ and the voltage $U_{control}$ are determined by the following steps:

step A1, calculating $I_{calibrated}$; where based on $C_{effluent}$, $I_{calibrated}$ is calculated according to $$I_{calibrated} = \frac{(C_{effluent} - K_2)}{K_5},$$

where $K_5$ is a constant greater than 0;

step A2, calculating $I_{control}$, and $U_{control}$; where based on $I_{calibrated}$, $I_{control}$ is determined according to $I_{control}=I_{calibrated}$, and then, $U_{control}$ is calculated according to $U_{control}=K_6 \cdot I_{control}+K_4$, where $K_6$ is a constant greater than 0.

Further, in step S002, an actual current $I_{detected}$ and the actual voltage $U_{detected}$ in the electrolytic cell are detected at $T_1$ intervals at the same time, and when $I_{detected}=I_{control}$, the corresponding $U_{detected}$ is acquired. $T_1=0.5$ s.

Further, in step S003, when $\Delta U>0$:

Based on $\Delta U$, V is calculated according to $V=1 \cdot \Delta U$, where $K_7$ is a constant greater than 0; and then, the first solution addition device adds the electrolyte stock solution to the electrolytic cell at a velocity V.

Further, $T_{calibrated}$ is any value of 20° C., 25° C. or 45° C.

Further, step S001 specifically includes the following steps:

step S0001, setting $C_{effluent}$; where a user sets a suitable effluent concentration of slightly acidic electrolyzed water $C_{effluent}$ in a master control unit according to actual needs, where $C_{effluent}$ is 20-90 ppm;

step S0002, carrying out initial solution addition; where the electrolyte stock solution in an electrolyte stock solution storage is added to the electrolytic cell by the first solution addition device, and when a detection liquid level of a liquid level detection unit is reached, the first solution addition device stops working; and the electrolyte stock solution is a dilute hydrochloric acid solution with a concentration of 6%-8%;

step S0003, carrying out electrolysis by energization; where the current $I_{control}$ and the voltage $U_{control}$ are applied to the two ends of the electrolytic cell by a current and voltage control unit, and the electrolysis is started in the electrolytic cell.

Further, a rear end of the electrolytic cell is connected in series with a first mixer, water is introduced into the first mixer, and a flow velocity of the water is $\geq 1$ L/min.

Further, when the electrolytic cell is in a standby state, a current 100 mA and a voltage 1000 mV are applied into the electrolytic cell and held for 3 s at 1200 s intervals, so that after start-up, an accurate concentration of slightly acidic electrolyzed water can be reached quickly.

The disclosure further provides a device for preparing slightly acidic electrolyzed water with a controllable and stable concentration, including an electrolyte stock solution storage, an electrolytic cell and a first mixer connected sequentially. A first solution addition device is connected in series between the electrolyte stock solution storage and the electrolytic cell, and the electrolytic cell is respectively connected with a current and voltage control unit and a current and voltage detection unit. When in use, a solution addition velocity of the first solution addition device is adjusted according to a difference between a detected voltage and a control voltage, so that the first solution addition device adds the electrolyte stock solution to the electrolytic cell in real time, thereby preparing the slightly acidic electrolyzed water with a controllable and stable concentration.

Further, the electrolytic cell is connected with a temperature detection unit configured to detect an electrolyte solution temperature and a liquid level detection unit configured to detect a liquid level. The device for preparing slightly acidic electrolyzed water with a controllable and stable concentration further includes a master control unit. The first solution addition device, the current and voltage control unit, the current and voltage detection unit, the temperature detection unit and the liquid level detection unit are all connected to the master control unit.

Further, a front end of the first mixer is connected with a flowmeter. A solenoid valve and a constant pressure valve are sequentially connected in series between the flowmeter and the first mixer, and water sequentially flows through the flowmeter, the solenoid valve and the constant pressure valve and enters the first mixer.

Further, the device for preparing slightly acidic electrolyzed water with a controllable and stable concentration further includes a neutralization solution storage, a second solution addition device and a second mixer sequentially connected in series. The second mixer is connected in series at a rear end of the first mixer. The first solution addition device and the second solution addition device are both peristaltic metering pumps.

(III) Beneficial Effects

The disclosure provides the method and device for preparing slightly acidic electrolyzed water with a controllable and stable concentration. In the method, after the electrolyte stock solution in the electrolytic cell is electrolyzed, the concentration of the slightly acidic electrolyzed water becomes lower. Then, the solution addition velocity of the first solution addition device is adjusted based on the difference between the detected voltage and the control voltage in the electrolytic cell, so that the first solution addition device adds the electrolyte stock solution to the electrolytic cell in real time. The voltage difference is greater, the rotation speed of the first solution addition device is faster. In one aspect, the decrease of the electrolyte stock solution in the electrolytic cell is compensated, the electrolysis velocity is increased, and a larger amount of chlorine gas is generated. In another aspect, an addition velocity of the chlorine gas discharged from the electrolytic cell is increased. Therefore, the velocity of reaction between chlorine gas and water is increased from two aspects, so the concentration of the slightly acidic electrolyzed water will increase, thereby achieving the purpose of preparing the slightly acidic electrolyzed water with a controllable and stable concentration. The device is simple in structure, can prepare the slightly acidic electrolyzed water with a controllable and stable concentration through the cooperation of various components, and overcomes the defects of uncontrollable and unstable concentration and low effective power in the preparation of the present slightly acidic electrolyzed water.

Corresponding component names of reference signs in the figures are: 1. electrolyte stock solution storage; 2. electrolytic cell; 3. first mixer; 4. first solution addition device; 5. current and voltage control unit; 6. current and voltage detection unit; 7. temperature detection unit; 8. liquid level detection unit; 9. master control unit; 10. flowmeter; 11. solenoid valve; 12. constant pressure valve; 13. neutralization solution storage; 14. second solution addition device; 15. second mixer.

DETAILED DESCRIPTION

Specific implementations of the disclosure will be further described in detail below with reference to the drawings and examples. The following examples are intended to illustrate the disclosure, but not to limit the scope of the disclosure.

Example I

Figure 5:
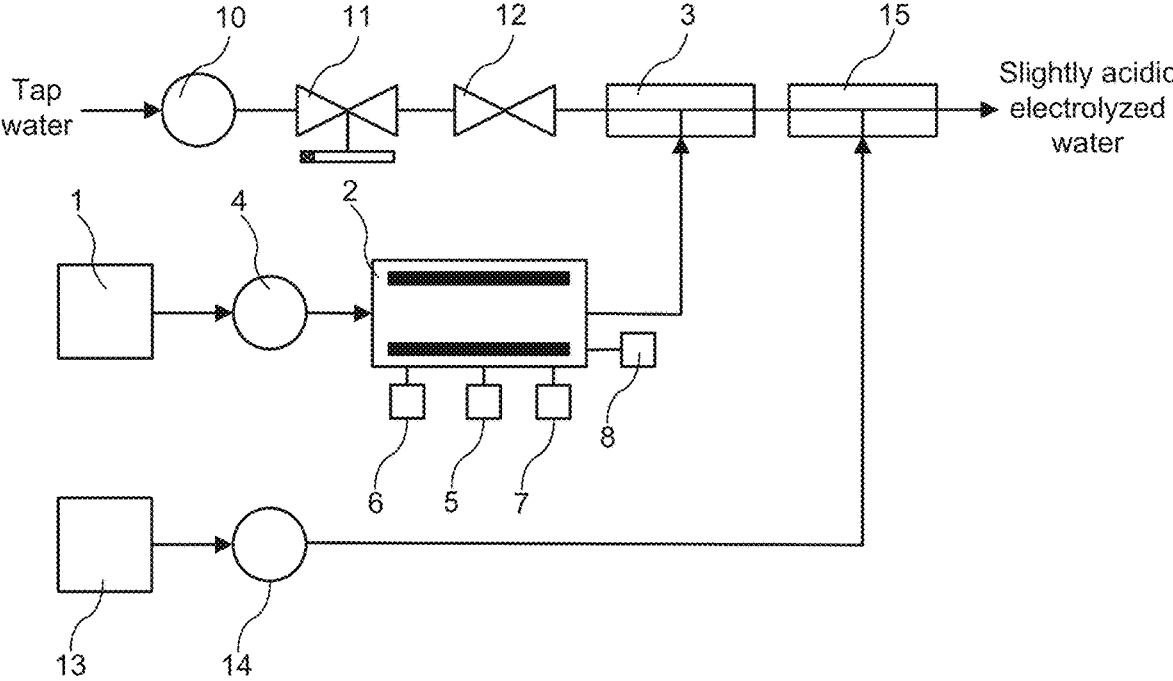
FIG. 5 is a schematic structural diagram of a device for preparing slightly acidic electrolyzed water with a controllable and stable concentration according to the disclosure.
Figure 6:
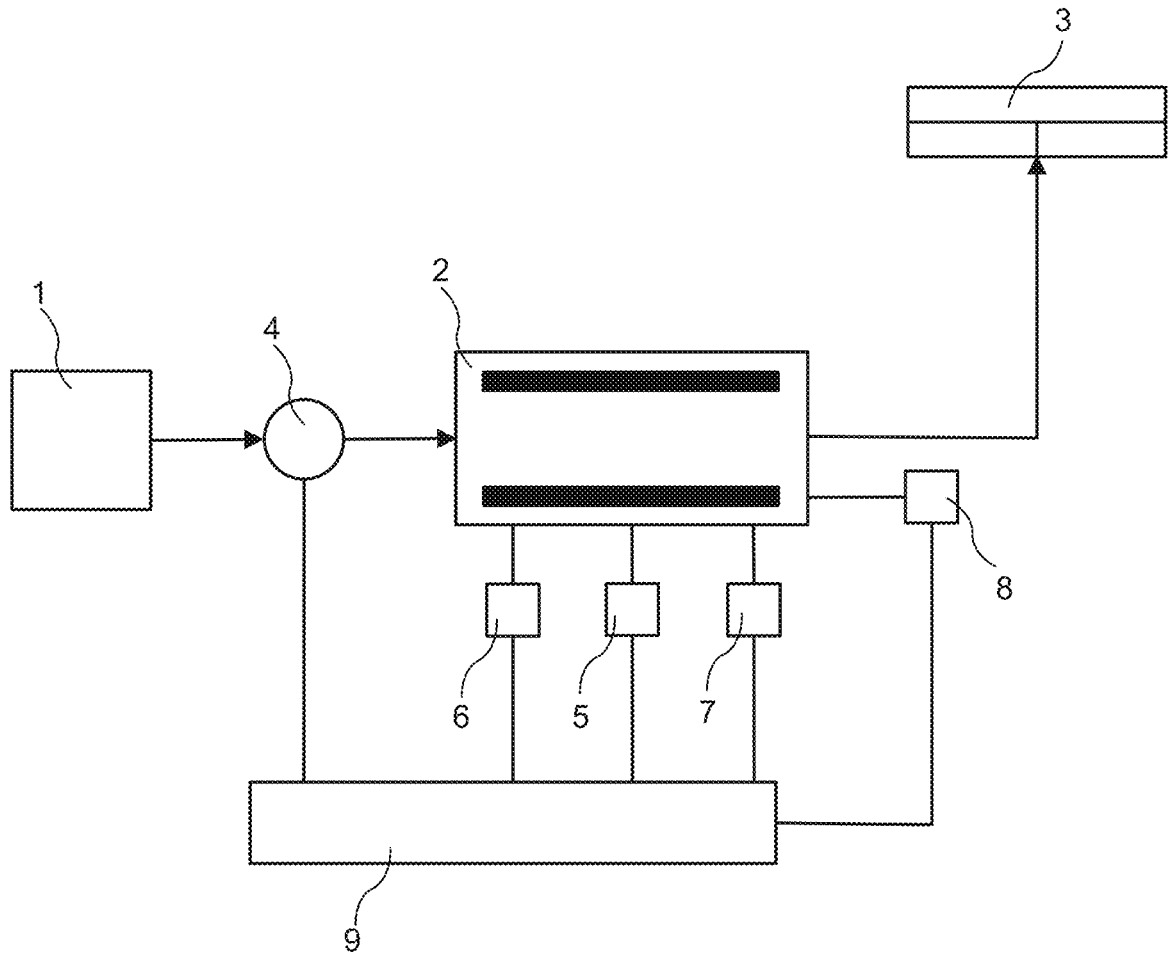
FIG. 6 is a schematic structural diagram of a master control unit connected to detection units in the device for preparing slightly acidic electrolyzed water with a controllable and stable concentration according to the disclosure.

Referring to FIG. 5 and FIG. 6, this example provides a device for preparing slightly acidic electrolyzed water with a controllable and stable concentration, including an electrolyte stock solution storage 1, an electrolytic cell 2 and a first mixer 3 connected sequentially. A first solution addition device 4 is connected in series between the electrolyte stock solution storage 1 and the electrolytic cell 2, and the first solution addition device 4 may be a peristaltic metering pump. The electrolytic cell 2 is respectively connected with a current and voltage control unit 5 and a current and voltage detection unit 6. The current and voltage control unit 5 is connected to the electrolytic cell 2 through an energized wire, and the current and voltage detection unit 6 is connected to the electrolytic cell 2 through a detection probe. The current and voltage control unit 5 is configured to control a current and a voltage across two ends of the electrolytic cell 2, and the current and voltage detection unit 6 is configured to detect the actual current and voltage in the electrolytic cell 2. When in use, a solution addition velocity of the first solution addition device 4 is adjusted according to a difference between a detected voltage $U_{detected}$ and a control voltage $U_{control}$, so that the first solution addition device 4 adds an electrolyte stock solution to the electrolytic cell 2 in real time, thereby preparing the slightly acidic electrolyzed water with a controllable and stable concentration.

Referring to FIG. 6, the device for preparing slightly acidic electrolyzed water with a controllable and stable concentration further includes a master control unit 9, the electrolytic cell 2 is connected with a temperature detection unit 7 configured to detect an electrolyte solution temperature and a liquid level detection unit 8 configured to detect a liquid level, and the temperature detection unit 7 may be a temperature probe. The first solution addition device 4, the current and voltage control unit 5, the current and voltage detection unit 6, the temperature detection unit 7 and the liquid level detection unit 8 are all connected to the master control unit 9. By arranging the current and voltage control unit 5, the current and voltage detection unit 6, the temperature detection unit 7 and the liquid level detection unit 8 that cooperate with each other, the rotation speed of the peristaltic metering pump can be adjusted through detection data and control data, thereby ensuring the feasibility of the structure.

Referring to FIG. 5, a front end of the first mixer 3 is connected with a flowmeter 10. A solenoid valve 11 and a constant pressure valve 12 are sequentially connected in series between the flowmeter 10 and the first mixer 3, and water sequentially flows through the flowmeter 10, the solenoid valve 11 and the constant pressure valve 12 and enters the first mixer 3. By using the flowmeter 10, the constant pressure valve 12 and the solenoid valve 11, a flow velocity of the water can be effectively controlled.

Figure 1:
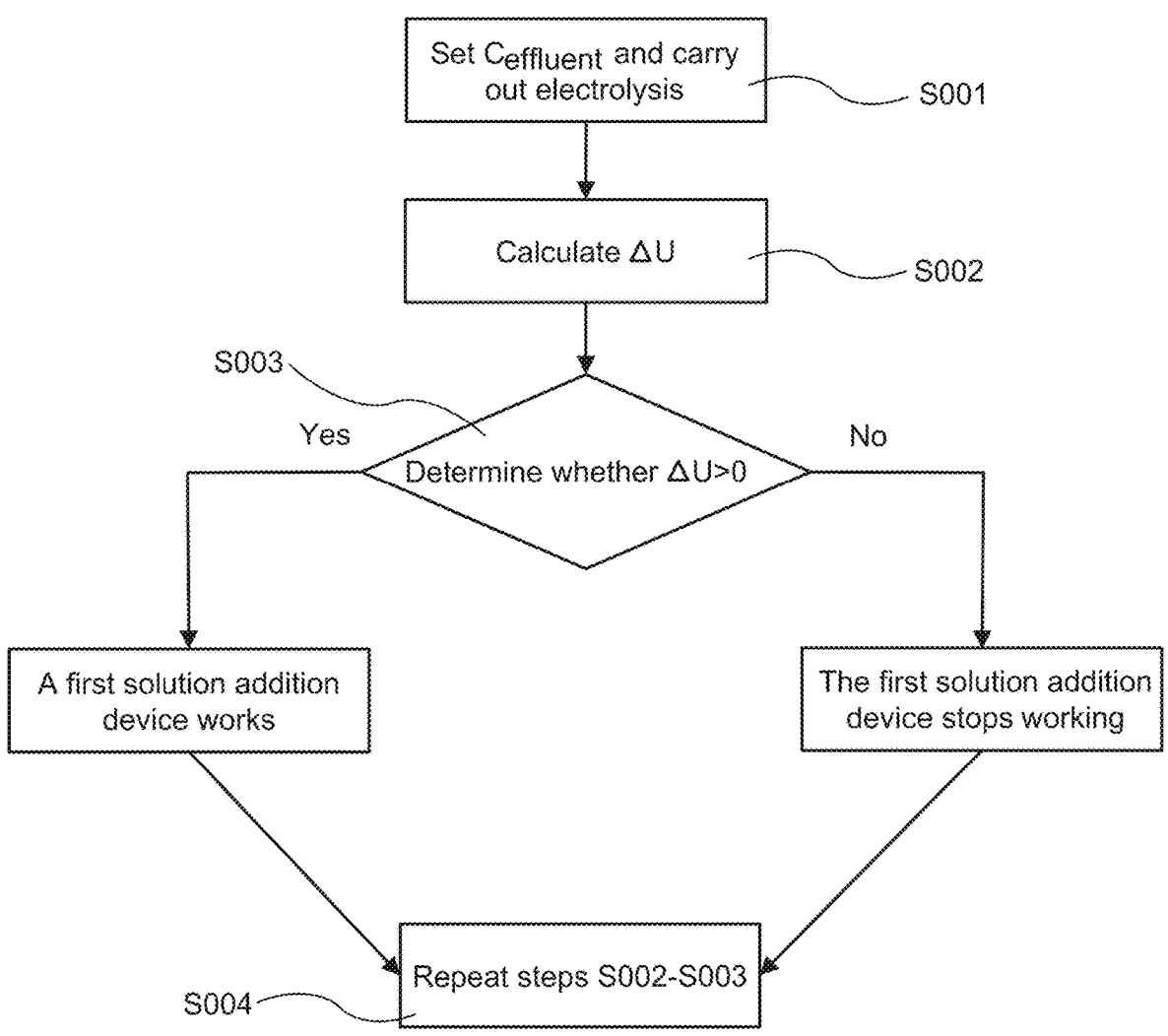
FIG. 1 is a schematic flow diagram of a method for preparing slightly acidic electrolyzed water with a controllable and stable concentration according to the disclosure.

Referring to FIG. 1, this example further provides a method for preparing slightly acidic electrolyzed water with a controllable and stable concentration based on the above device. A solution addition velocity of a first solution addition device 4 is adjusted according to a difference between a detected voltage $U_{detected}$ and a control voltage $U_{control}$ in an electrolytic cell 2, so that the first solution addition device 4 adds an electrolyte stock solution to the electrolytic cell 2 in real time, thereby preparing the slightly acidic electrolyzed water with a controllable and stable concentration.

The Method Specifically Includes the Following Steps:

step S001, setting $C_{effluent}$ and carrying out electrolysis; where a suitable effluent concentration of slightly acidic electrolyzed water $C_{effluent}$ is set according to needs, and after the electrolytic cell is filled up with the electrolyte stock solution, a current $I_{control}$ and a voltage $U_{control}$ are applied to two ends of the electrolytic cell 2 and electrolysis is started;

step S002, calculating $\Delta U$; where the actual voltage $U_{detected}$ in the electrolytic cell 2 is detected, and $\Delta U$ is calculated according to $$\Delta U = U_{detected} - U_{control};$$

step S003, determining whether $\Delta U$ is greater than 0;

if so, the first solution addition device 4 works;

if not, the first solution addition device 4 stops working;

step S004, repeating steps S002-S003.

In step S002, an actual current $I_{detected}$ and the actual voltage $U_{detected}$ in the electrolytic cell 2 are detected at $T_1$ intervals at the same time, and when $I_{detected} = I_{control}$, $U_{detected}$ corresponding to $I_{detected}$ is acquired. $T_1 = 0.5$ s. In a case that $I_{detected} = I_{control}$ is not detected continuously for a certain period of time, if $I_{detected} \leq I_{control}$, the output of $U_{control}$ will automatically increase until it reaches the maximum value; and if $I_{detected} > I_{control}$, the output of $U_{control}$ will automatically decrease until it reaches the minimum value, the electrolytic cell is shut down for maintenance.

In Step S003, when $\Delta U > 0$:

based on $\Delta U$, V is calculated according to $V = K_7 \cdot \Delta U$, and then, the first solution addition device 4 adds the electrolyte stock solution to the electrolytic cell 2 at a velocity V until a next velocity V sent by the master control unit 10 is received. $K_7$ is a constant greater than 0, and $K_7$ may be 90-110. The unit of $\Delta U$ is V, and the voltage detection accuracy is 0.01V. The unit of V is r/min.

Further, a rear end of the electrolytic cell 2 is connected in series with a first mixer 3, water is introduced into the first mixer 3, the water may be tap water, a flow velocity of the water is $\geq 1$ L/min, and the flow velocity of the water may be 1.2 L/min. A distance between two electrodes of the electrolytic cell used is 2.7 mm, and an area of the electrode is 14400 mm$^2$.

Example II

Figure 2:
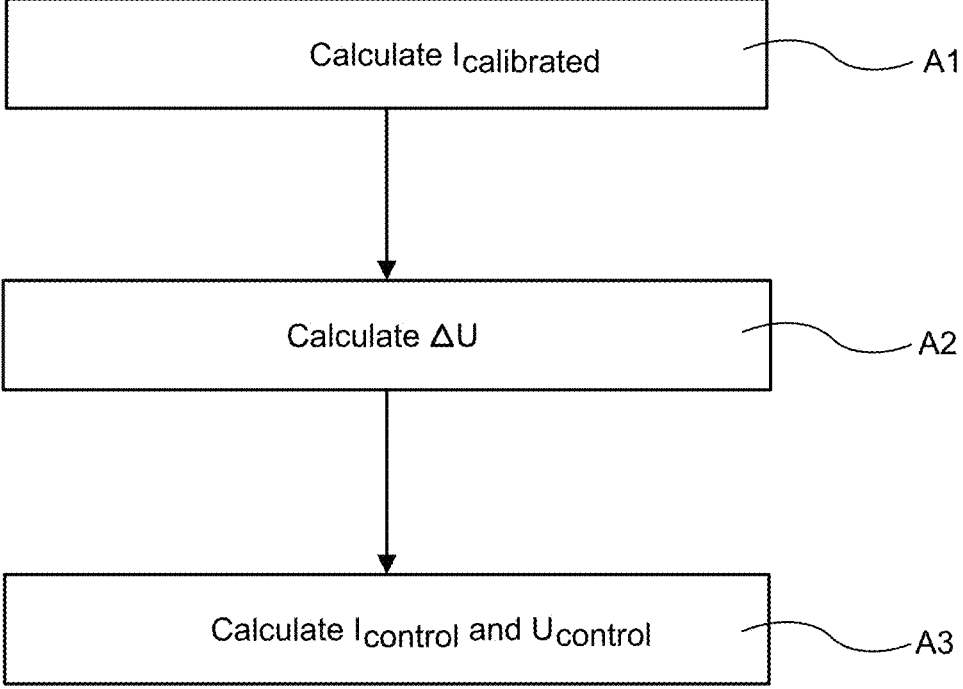
FIG. 2 is a schematic flow diagram of determining $I_{control}$ and $U_{control}$ in the method for preparing slightly acidic electrolyzed water with a controllable and stable concentration according to the disclosure.

Referring to FIG. 1 and FIG. 2, a method for preparing slightly acidic electrolyzed water with a controllable and stable concentration provided by this example is different from Example I in that: in step S001, $U_{control}$ is determined according to $U_{control} = f(C_{effluent}, T_{detected})$ where $U_{control}$ is directly proportional to $C_{effluent}$, and $U_{control}$ is inversely proportional to $T_{detected}$.

Specifically, $U_{control}$ is calculated according to the following formula:

$$U_{control} = K_1 \cdot (C_{effluent} - K_2) \cdot [1 - K_3 \cdot (T_{detected} - T_{calibrated})] + K_4$$

where $K_1$, $K_2$, $K_3$, $K_4$ and $T_{calibrated}$ are all constants greater than 0, $K_1$ may be 0.03-0.048, $K_2$ may be 12.929-14.929, $K_3$ may be 0-1, $K_4$ may be 1.8328-3.8328, $T_{calibrated}$ may be any value of 20° C., 25° C. or 45° C.

Further, $I_{control}$ and the voltage $U_{control}$ are determined by the following steps:

step A1, calculating $I_{calibrated}$; where based on $C_{effluent}$, $I_{calibrated}$ is calculated according to $$I_{calibrated} = \frac{(C_{effluent} - K_2)}{K_5},$$

where $K_5$ is a constant greater than 0, and $K_5$ may be 14.746-16.746;

step A2, calculating $\Delta T$; where an actual temperature $T_{detected}$ of the electrolyte solution in the electrolytic cell 2 is detected, preset $T_{calibrated}$ in the system is acquired, and $\Delta T$ is calculated according to $\Delta T = T_{detected} - T_{calibrated}$;

step A3, calculating $I_{control}$ and $U_{control}$; where based on $\Delta T$, $I_{control}$ is calculated according to $I_{control} = I_{calibrated}(1 - K_3 \cdot \Delta T)$; and then, $U_{control}$ is calculated according to $U_{control} = K_6 \cdot I_{control} + K_4$, where $K_6$ is a constant greater than 0, and $K_6$ may be 0.5076-0.7076.

After the current $I_{control}$ and the voltage $U_{control}$ are applied to the two ends of the electrolytic cell 2, the current in the electrolytic cell 2 starts to slowly rise from 0 to $I_{control}$ and is then kept constant. As the electrolyte solution is electrolyzed at the constant current, the final electrolyte solution in the electrolytic cell contains a mixed solution of chlorine gas molecules, hypochlorous acid molecules, hypochlorite ions, chlorine ions, sodium ions and hydrogen ions, and the concentration of hydrochloric acid decreases. In order to maintain the constant current value, the master control unit gives a higher output voltage to the electrolytic cell, and at the same time, the master control unit detects the actual voltage value in the electrolytic cell through the current and voltage detection unit, and controls the rotation speed of the peristaltic pump according to the difference between the actual voltage and the actual control voltage. The voltage difference is greater, the higher the rotation speed of the first solution addition device is faster. In one aspect, the decrease of the electrolyte stock solution in the electrolytic cell is compensated, the electrolysis velocity is increased, and a larger amount of chlorine gas is generated. In another aspect, an addition velocity of the chlorine gas discharged from the electrolytic cell is increased. Therefore, the velocity of reaction between chlorine gas and water is increased from two aspects, so the concentration of the slightly acidic electrolyzed water will increase, thereby achieving the purpose of preparing the slightly acidic electrolyzed water with a controllable and stable concentration.

Example III

Figure 3:
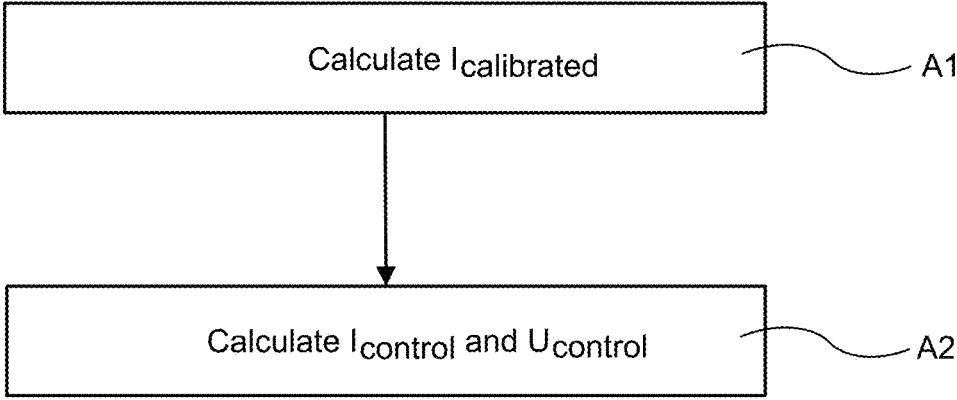
FIG. 3 is another schematic flow diagram of determining $I_{control}$ and $U_{control}$ in the method for preparing slightly acidic electrolyzed water with a controllable and stable concentration according to the disclosure.

Referring to FIG. 1 and FIG. 3, a method for preparing slightly acidic electrolyzed water with a controllable and stable concentration provided by this example is different from Example I in that: in step S001, $U_{control}$ is determined according to $U_{control} = f(C_{effluent})$, where $U_{control}$ is directly proportional to $C_{effluent}$.

Specifically, $U_{control}$ is calculated according to the following formula:

$$U_{control} = K_1 \cdot (C_{effluent} - K_2) + K_4$$

where $K_1$, $K_2$ and $K_4$ are all constants greater than 0, $K_1$ may be 0.03-0.048, $K_2$ may be 12.929-14.929, and $K_4$ may be 1.8328-3.8328.

Further, $I_{control}$ and the voltage $U_{control}$ are determined by the following steps:

step A1, calculating $I_{calibrated}$; where based on $C_{effluent}$, $I_{calibrated}$ is calculated according to $$I_{calibrated} = \frac{(C_{effluent} - K_2)}{K_5},$$

where $K_5$ is a constant greater than 0, and $K_5$ may be 14.746-16.746;

step A2, calculating $I_{control}$ and $U_{control}$; where based on $I_{calibrated}$ $I_{control}$ is determined according to $I_{control}=I_{calibrated}$, and then, $U_{control}$ is calculated according to $U_{control}=K_6 \cdot I_{control}+K_4$, where $K_6$ is a constant greater than 0, and $K_6$ may be 0.5076-0.7076.

Example IV

Figure 4:
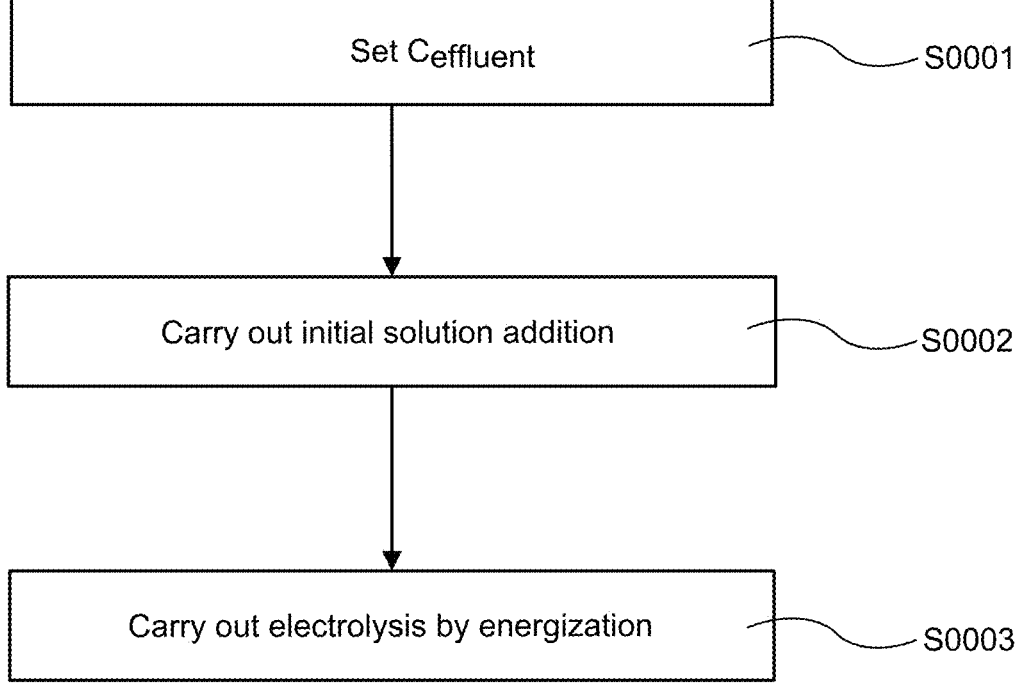
FIG. 4 is a schematic flow diagram of step S001 in the method for preparing slightly acidic electrolyzed water with a controllable and stable concentration according to the disclosure.

Referring to FIG. 1 and FIG. 4, a method for preparing slightly acidic electrolyzed water with a controllable and stable concentration provided by this example is different from Example I in that: step S001 specifically includes the following steps:

step S0001, setting $C_{effluent}$; where a user sets a suitable effluent concentration of slightly acidic electrolyzed water $C_{effluent}$ in a master control unit 9 according to actual needs, where $C_{effluent}$ is 20-90 ppm;

step S0002, carrying out initial solution addition; where the electrolyte stock solution in an electrolyte stock solution storage 1 is added to the electrolytic cell 2 by the first solution addition device 4, and when a detection liquid level of a liquid level detection unit 8 is reached, the first solution addition device 4 stops working; and the electrolyte stock solution is a dilute hydrochloric acid solution with a concentration of 6%-8%;

step S0003, carrying out electrolysis by energization; where the current $I_{control}$ and the voltage $U_{control}$ are applied to the two ends of the electrolytic cell 2 by a current and voltage control unit 5, and the electrolysis is started in the electrolytic cell 2.

Example V

A method for preparing slightly acidic electrolyzed water with a controllable and stable concentration provided by this example is different from Example I in that: when the electrolytic cell is in a standby state, a current 100 mA and a voltage 1000 mV are applied into the electrolytic cell and held for 3 s at 1200 s intervals, so that after start-up, an accurate concentration of slightly acidic electrolyzed water can be reached quickly.

When the electrolytic cell 2 is in the standby state, since the electrolyte solution has not been energized for a long time, the chlorine gas dissolved in the electrolyte solution decreases slowly, and the electrolyte solution appears transparent. Therefore, very small current and voltage are maintained in the electrolytic cell at intervals, so that the concentration of the chlorine gas in the electrolyte solution is maintained but the chlorine gas is not discharged out to the mixer, and thus, the electrolyte solution appears yellowish-green. When the electrolytic cell 2 starts to prepare the slightly acidic electrolyzed water, since there is already a certain concentration of chlorine gas in the electrolyte solution, the accurate concentration of the slightly acidic electrolyzed water can be quickly reached.

Example VI

Referring to FIG. 5 and FIG. 6, a device for preparing slightly acidic electrolyzed water with a controllable and stable concentration provided by this example is different from Example I in that: the device for preparing slightly acidic electrolyzed water with a controllable and stable concentration further includes a neutralization solution storage 13, a second solution addition device 14 and a second mixer 15 sequentially connected in series. The second mixer 15 is connected in series at a rear end of the first mixer 3. The first solution addition device 4 and the second solution addition device 14 are both peristaltic metering pumps. By connecting the second mixer 15 in series to the rear end of the first mixer 3, the concentration of the slightly acidic electrolyzed water can be effectively neutralized, which is more convenient to use.

Tests have proved that the slightly acidic electrolyzed water with a controllable and stable concentration can be prepared by using any of the above examples. The results are shown in the following table:

| $C_{effluent}$ | L | S | C | $U_{calibrated}$ | $I_{calibrated}$ | $V_{water}$ | $C_{final}$ |
|---|---|---|---|---|---|---|---|
| 20 | 2.7 | 14400 | 7.3% | 3.15 | 0.51 | 1.2 | 21 |
| 31 | 2.7 | 14400 | 7.3% | 3.51 | 1.10 | 1.2 | 33 |
| 39 | 2.7 | 14400 | 7.3% | 3.83 | 1.62 | 1.2 | 42 |
| 49 | 2.7 | 14400 | 7.3% | 4.22 | 2.27 | 1.2 | 51 |
| 53 | 2.7 | 14400 | 7.3% | 4.37 | 2.52 | 1.2 | 53 |
| 62 | 2.7 | 14400 | 7.3% | 4.72 | 3.11 | 1.2 | 61 |
| 68 | 2.7 | 14400 | 7.3% | 4.96 | 3.49 | 1.2 | 68 |
| 72 | 2.7 | 14400 | 7.3% | 5.11 | 3.75 | 1.2 | 72 |
| 80 | 2.7 | 14400 | 7.3% | 5.42 | 4.27 | 1.2 | 80 |
| 90 | 2.7 | 14400 | 7.3% | 5.82 | 4.92 | 1.2 | 91 |

$C_{effluent}$ is the concentration of the input slightly acidic electrolyzed water in ppm. L is the distance between the two electrodes in mm. S is the area of the electrode in mm$^2$. C is the initial concentration of the hydrochloric acid in %. $U_{calibrated}$ is the calibrated voltage in V. $I_{calibrated}$ is the calibrated current in A. $V_{water}$ is the flow velocity of water in L/min. $C_{final}$ is the available chlorine concentration of the prepared slightly acidic electrolyzed water effluent in ppm.

It can be seen from the above table that the method and device for preparing slightly acidic electrolyzed water with a controllable and stable concentration provided by the disclosure can prepare slightly acidic electrolyzed water with a concentration of 20-90 ppm, which meets the national standard for slightly acidic electrolyzed water (40-80 ppm). Besides, the method and device can prepare slightly acidic electrolyzed water with a controllable and stable concentration. When the concentration of the slightly acidic electrolyzed water is stable and controllable, the slightly acidic electrolyzed water with different concentrations can be prepared according to one's own needs. The slightly acidic electrolyzed water with different concentrations has different functions, for example, washing, vegetable washing, dish washing and the like, so that the slightly acidic electrolyzed water has stronger functionality, wider application range and more application scenarios.

The disclosure provides the method and device for preparing slightly acidic electrolyzed water with a controllable and stable concentration. In the method, after the electrolyte stock solution in the electrolytic cell is electrolyzed, the concentration of the slightly acidic electrolyzed water becomes lower. Then, the solution addition velocity of the first solution addition device is adjusted based on the difference between the detected voltage and the control voltage in the electrolytic cell, so that the first solution addition device adds the electrolyte stock solution to the electrolytic cell in real time. The voltage difference is greater, the rotation speed of the first solution addition device is faster. In one aspect, the decrease of the electrolyte stock solution in the electrolytic cell is compensated, the electrolysis velocity is increased, and a larger amount of chlorine gas is generated. In another aspect, an addition velocity of the chlorine gas discharged from the electrolytic cell is increased. Therefore, the velocity of reaction between chlorine gas and water is increased from two aspects, so the concentration of the slightly acidic electrolyzed water will increase, thereby achieving the purpose of preparing the slightly acidic electrolyzed water with a controllable and stable concentration. The device is simple in structure, can prepare the slightly acidic electrolyzed water with a controllable and stable concentration through the cooperation of various components, and overcomes the defects of uncontrollable and unstable concentration and low effective power in the preparation of the present slightly acidic electrolyzed water.

The above description is only preferred implementations of the disclosure. It should be noted that those of ordinary skill in the art can also make several improvements and modifications without departing from the technical principles of the disclosure, and such improvements and modifications should also be considered as the protection scope of the disclosure.

What is claimed:

1. A method for preparing slightly acidic electrolyzed water with a controllable and stable concentration, wherein a solution addition velocity of a first solution addition device is adjusted according to a difference between an actual a voltage U and a control voltage $U_{control}$ in an electrolytic cell, so that the first solution addition device adds an electrolyte stock solution to the electrolytic cell in real time, thereby preparing the acidic electrolyzed water with a controllable and stable concentration.

2. The method for preparing the acidic electrolyzed water with a controllable and stable concentration according to claim 1, specifically comprising the following steps:

step S001, setting $C_{effluent}$ and carrying out electrolysis; wherein a suitable effluent concentration of acidic electrolyzed water $C_{effluent}$ is set according to needs, and after the electrolytic cell is filled up with the electrolyte stock solution, a current $I_{control}$ and the control voltage $U_{control}$ are applied to two ends of the electrolytic cell and the electrolysis is started;

step S002, calculating $\Delta U$; wherein the actual voltage $U_{detected}$ in the electrolytic cell is detected, and $\Delta U$ is calculated according to $\Delta U = U_{detected} - U_{control}$;

step S003, determining whether $\Delta U$ is greater than 0; if so, the first solution addition device works; if not, the first solution addition device stops working; and step S004, repeating steps S002-S003.

3. The method for preparing the acidic electrolyzed water with a controllable and stable concentration according to claim 2, wherein in step S001, $U_{control}$ is determined according to $U_{control} = f(C_{effluent}, T_{detected})$, wherein $U_{control}$ directly proportional to $C_{effluent}$, and $U_{control}$ is inversely proportional to an actual temperature, $T_{detected}$.

4. The method for preparing the acidic electrolyzed water with a controllable and stable concentration according to claim 3, wherein $U_{control}$ is calculated according to:

$$U_{control} = K_1 \cdot (C_{effluent} - K_2) \cdot [1 - K_3 \cdot (T_{detected} - T_{calibrated})] + K_4$$

Wherein a first constant $K_1$, a second constant $K_2$, a third constant $K_3$, a fourth constant $K_4$ and a preset temperature $T_{calibrated}$ are all constants greater than 0.

5. The method for preparing the acidic electrolyzed water with a controllable and stable concentration according to claim 2, wherein in step S001, $U_{control}$ is determined according to $U_{control} = f(C_{effluent})$, wherein $U_{control}$ is directly proportional to $C_{effluent}$.

6. The method for preparing the acidic electrolyzed water with a controllable and stable concentration according to claim 5, wherein $U_{control}$ is calculated according to:

$$U_{control} = K_1 \cdot (C_{effluent} - K_2) + K_4$$

wherein a first constant $K_1$, a second constant $K_2$ and a fourth constant $K_4$ are all constants greater than 0.

7. The method for preparing the acidic electrolyzed water with a controllable and stable concentration according to claim 4, wherein $I_{control}$ and the control voltage $U_{control}$ are determined by the following steps:

step A1, calculating $I_{calibrated}$; wherein based on $C_{effluent}$, $I_{calibrated}$ is calculated according to $$I_{calibrated} = \frac{(C_{effluent} - K_2)}{K_5},$$

wherein a fifth constant $K_5$ is a constant greater than 0;

step A2, calculating $\Delta T$; wherein the actual temperature $T_{detected}$ electrolyte solution in the electrolytic cell (2) is detected, preset $T_{calibrated}$ in the system is acquired, and $\Delta T$ is calculated according to $\Delta T = T_{detected} - T_{calibrated}$; and step A3, calculating $I_{control}$ and $U_{control}$; wherein based on $\Delta T$, $I_{control}$ is calculated according to $I_{control} = I_{calibrated}(1 - K_3 \cdot \Delta T)$; and then, $U_{control}$ is calculated according to $U_{control} = K_6 \cdot I_{control} + K_4$, wherein a sixth constant $K_6$ is a constant greater than 0.

8. The method for preparing the acidic electrolyzed water with a controllable and stable concentration according to claim 6, wherein $I_{control}$ and the control voltage $U_{control}$ are determined by the following steps:

step A1, calculating $I_{calibrated}$; wherein based on $C_{effluent}$, $I_{calibrated}$ is calculated according to $$I_{calibrated} = \frac{(C_{effluent} - K_2)}{K_5},$$

wherein a fifth constant $K_5$ is a constant greater than 0; and step A2, calculating $I_{control}$ and $U_{control}$; wherein based on $I_{calibrated}$, $I_{control}$ is determined according to $I_{control} = I_{calibrated}$, and then, $U_{control}$ is calculated according to $U_{control} = K_6 \cdot I_{control} + K_4$, wherein a sixth constant $K_6$ is a constant greater than 0.

9. The method for preparing the acidic electrolyzed water with a controllable and stable concentration according to claim 2, wherein in step S002, an actual current $I_{detected}$ and the actual voltage $U_{detected}$ in the electrolytic cell are detected at $T_1$ intervals, and when $I_{detected} = I_{control}$, the corresponding $U_{detected}$ is acquired.

10. The method for preparing the acidic electrolyzed water with a controllable and stable concentration according to claim 2, wherein in step S003, when $\Delta U > 0$:

based on $\Delta U$, V is calculated according to $V = K_7 \cdot \Delta U$, wherein a seventh constant $K_7$ is a constant greater than 0; and then, the first solution addition device adds the electrolyte stock solution to the electrolytic cell at a velocity V.

11. The method for preparing the acidic electrolyzed water with a controllable and stable concentration according to claim 4, wherein $T_{calibrated}$ is any value of 20° C., 25° C. or 45° C.

12. The method for preparing the acidic electrolyzed water with a controllable and stable concentration according to claim 2, wherein step S001 specifically comprises the following steps:

step S0001, setting $C_{effluent}$; wherein a user sets the suitable effluent concentration of acidic electrolyzed water $C_{effluent}$ in a master control unit according to actual needs, wherein $C_{effluent}$ is 20-90 ppm;

step S0002, carrying out initial solution addition; wherein the electrolyte stock solution in an electrolyte stock solution storage is added to the electrolytic cell by the first solution addition device, and when a detection liquid level of a liquid level detection unit is reached, the first solution addition device stops working; and the electrolyte stock solution is a dilute hydrochloric acid solution with a concentration of 6%-8%; and step S0003, carrying out electrolysis by energization; wherein the current $I_{control}$ and the control voltage $U_{control}$ are applied to the two ends of the electrolytic cell by a current and voltage control unit, and the electrolysis is started in the electrolytic cell.

13. The method for preparing the acidic electrolyzed water with a controllable and stable concentration according to claim 1, wherein a rear end of the electrolytic cell is connected in series with a first mixer, water is introduced into the first mixer, and a flow velocity of the water is ≥1 L/min.

14. The method for preparing the acidic electrolyzed water with a controllable and stable concentration according to claim 1, wherein when the electrolytic cell is in a standby state, a current 100 mA and a voltage 1000 mV are applied into the electrolytic cell and held for 3 s at 1200 s intervals, so that after start-up, an accurate concentration of acidic electrolyzed water is reached quickly.

* * * * *